United States Patent
Ashenfelter et al.

(10) Patent No.: US 9,595,143 B1
(45) Date of Patent: *Mar. 14, 2017

(54) SYSTEMS, APPARATUS, AND METHODS FOR CONTINUOUS AUTHENTICATION

(71) Applicant: Noblis, Inc., Falls Church, VA (US)

(72) Inventors: Timothy Patrick Ashenfelter, Alexandria, VA (US); George Ihor Kiebuzinski, Montgomery Village, MD (US); John R. Mercier, Fairfax, VA (US); Matthew K. Monaco, Falls Church, VA (US); Lawrence Dennis Nadel, North Potomac, MD (US); Jonathan Mark Phillips, Fairfax, VA (US); Daniel Farlow Uyesugi, Fayetteville, GA (US)

(73) Assignee: Noblis, Inc., Falls Church, VA (US)

( * ) Notice: Subject to any disclaimer, the term of this patent is extended or adjusted under 35 U.S.C. 154(b) by 284 days.

This patent is subject to a terminal disclaimer.

(21) Appl. No.: 14/550,074

(22) Filed: Nov. 21, 2014

Related U.S. Application Data

(63) Continuation of application No. 13/026,992, filed on Feb. 14, 2011, now Pat. No. 8,922,342.

(Continued)

(51) Int. Cl.
  *G06K 9/00* (2006.01)
  *G06K 19/00* (2006.01)
  (Continued)

(52) U.S. Cl.
  CPC ................. *G07C 9/00087* (2013.01)

(58) Field of Classification Search
  CPC ........ G06F 21/32; G06F 1/1632; G06F 21/34; G06F 21/6245; G07C 9/00158;
  (Continued)

(56) References Cited

U.S. PATENT DOCUMENTS 5,229,764 A * 7/1993 Matchett ............ G07C 9/00158
  340/5.52
5,719,950 A * 2/1998 Osten .................. A61B 5/0205
  340/5.82

(Continued)

OTHER PUBLICATIONS

Fang, Shih-Chin, et al., "Human Identification by Quantifying Similarity and Dissimilarity in Electrocardiogram Phase Space," *Pattern Recognition*, vol. 42, Issue 9, Sep. 2009, pp. 1824-1831.

(Continued)

*Primary Examiner* — Steven Lim
*Assistant Examiner* — Muhammad Adnan
(74) *Attorney, Agent, or Firm* — Morrison & Foerster LLP

(57) ABSTRACT

Systems, apparatus, and methods for continuously authenticating individuals are provided. A continuous authentication system receives first biometric authentication information from an individual. The system compares the first biometric authentication information to stored first biometric information to identify the individual and links the identified individual to a device for obtaining second biometric authentication information. The device for obtaining second biometric authentication information continuously receives second biometric authentication information. The continuous authentication system compares the received second biometric authentication information to stored second biometric information that corresponds to the individual to determine if the received second biometric authentication information corresponds to the individual. The individual may be granted access to one or more access points if it is determined that the received second biometric authentication information corresponds to the individual.

20 Claims, 8 Drawing Sheets

Related U.S. Application Data

(60) Provisional application No. 61/304,723, filed on Feb. 15, 2010.

(51) Int. Cl.
| | | |
|---|---|---|
| *G06F 7/00* | (2006.01) | |
| *G08B 29/00* | (2006.01) | |
| *G06T 1/00* | (2006.01) | |
| *G06K 9/22* | (2006.01) | |
| *G07C 9/00* | (2006.01) | |

(58) Field of Classification Search
CPC ..... G07C 9/00563; A61B 5/117; A61B 3/117; G06K 2009/0006; G06K 2009/00932; G06K 9/00906; G06K 9/00013; G06K 9/00033

See application file for complete search history.

(56) References Cited

U.S. PATENT DOCUMENTS

| | | | | |
|---|---|---|---|---|
| 7,421,105 | B2* | 9/2008 | Hirai | G01N 1/30 382/133 |
| 7,545,963 | B2* | 6/2009 | Rowe | G06K 9/00033 340/5.53 |
| 7,899,217 | B2 | 3/2011 | Uludag et al. | |
| 7,956,730 | B2* | 6/2011 | White | A61B 5/117 180/272 |
| 8,744,139 | B2* | 6/2014 | McNulty | G06K 9/00013 382/116 |
| 2005/0190372 | A1* | 9/2005 | Dogariu | A61B 5/0066 356/479 |
| 2006/0059364 | A1* | 3/2006 | Fontijn | G07C 9/00563 713/186 |
| 2006/0080552 | A1* | 4/2006 | Lauper | G06F 1/1632 713/186 |
| 2006/0190836 | A1* | 8/2006 | Ling Su | G06F 1/1616 715/773 |
| 2006/0210120 | A1* | 9/2006 | Rowe | A61B 5/117 382/115 |
| 2007/0058841 | A1* | 3/2007 | Miura | G06K 9/00013 382/115 |
| 2007/0201727 | A1* | 8/2007 | Birrell | A63B 24/00 382/115 |
| 2007/0296601 | A1* | 12/2007 | Sultan | A61B 5/18 340/576 |
| 2008/0045806 | A1* | 2/2008 | Keppler | A61B 5/0002 600/300 |
| 2008/0247607 | A1* | 10/2008 | Amano | G06K 9/00885 382/115 |
| 2008/0297788 | A1* | 12/2008 | Rowe | A61B 5/117 356/300 |
| 2009/0028396 | A1* | 1/2009 | Kishima | A61B 5/0062 382/124 |
| 2009/0074255 | A1 | 3/2009 | Holm | |
| 2009/0202113 | A1* | 8/2009 | Fujii | A61B 3/1233 382/117 |
| 2010/0050253 | A1* | 2/2010 | Baughman | G06F 21/6245 726/21 |
| 2010/0113950 | A1 | 5/2010 | Lin et al. | |
| 2010/0179389 | A1* | 7/2010 | Moroney, III | G06F 19/3406 600/301 |
| 2011/0001814 | A1* | 1/2011 | Yamanaka | A61B 5/117 348/78 |
| 2011/0077548 | A1* | 3/2011 | Torch | A61B 3/112 600/558 |
| 2012/0013724 | A1 | 1/2012 | McNulty | |
| 2012/0271121 | A1* | 10/2012 | Della Torre | A61B 5/024 600/301 |

OTHER PUBLICATIONS

Gambon, Jill, "Ultra-Wideband RFID Tracks Nuclear Power Plant Workers," *RFID Journal*, RFID Journal Inc., 2005, 3 pages, http://www.rfidjournal.com/article/view/3126/1, accessed Feb. 14, 2011.

Garcia-Baleon, H.A., et al., "A Wavelet-Based 128-Bit Key Generator Using Electrocardiogram Signals," *52nd IEEE International Midwest Symposium on Circuits and Systems*, 2009, pp. 644-647, http://www.computer.org/portal/web/cssdl/doi/10.1109/MWSCAS.2009.5236010, accessed Feb. 14, 2011.

Israel, Steven A., et al., "ECG to Identify Individuals," *Pattern Recognition*, vol. 38, 2005, pp. 133-142; http://www.vrphobia.com/library/040521.pdf, accessed Feb. 14, 2011.

"IMEC Reports Two Wireless Platforms for Biomedical Monitoring," *IMEC*, Feb. 4, 2007, 2 pages, http://www.2.imec.be/be_en/press/imec-news/archive-2007/imec-reports-two-wireless-platforms-for-biomedical-monitoring.html, accessed Feb. 14, 2011.

Wall, Joan Slattery, "Biosensor System Detects Human Emotion," *News in Engineering*, The Ohio State University; College of Engineering, 2 pages, http://engineering.osu.edu/nie/biosensor-system-detects-human-emotion, accessed Mar. 2, 2011.

"AutoSense: A Wireless Sensor System to Quantify Personal Exposures to Psychosocial Stress and Addictive Substances in Natural Environments," *National Institutes of Health*, Genes Environment and Health Initiative, 4 pages, http://sites.google.com/site/autosenseproject, accessed Mar. 2, 2011.

\* cited by examiner

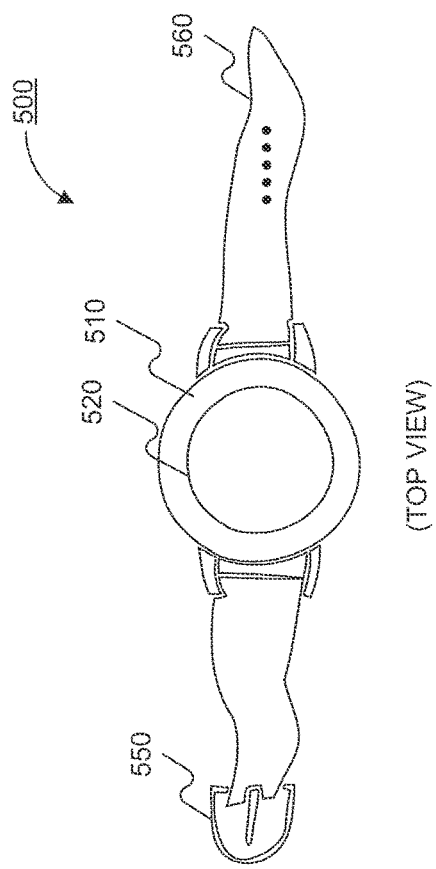
FIG. 5A (TOP VIEW)
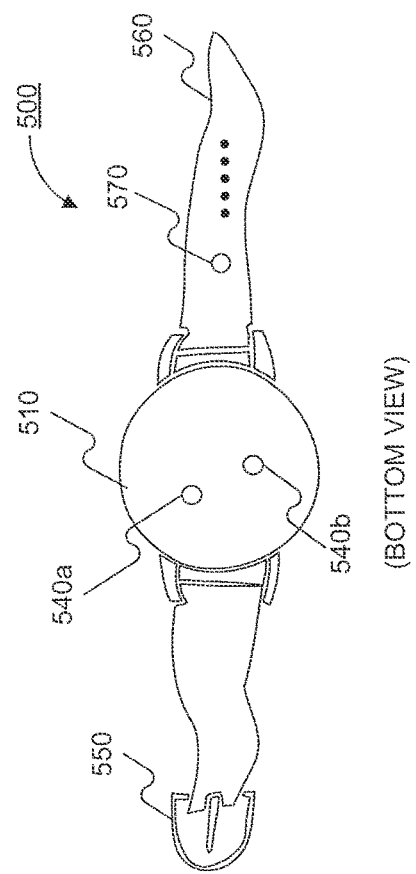
FIG. 5B (BOTTOM VIEW)

SYSTEMS, APPARATUS, AND METHODS FOR CONTINUOUS AUTHENTICATION

RELATED APPLICATIONS

This application is a continuation of and claims priority from U.S. patent application Ser. No. 13/026,992, filed Feb. 14, 2011, which is a non-provisional of and claims priority from U.S. Provisional Application No. 61/304,723 filed Feb. 15, 2010. Each aforementioned application is incorporated herein by reference in its entirety.

FIELD OF THE INVENTION

The invention relates generally to authenticating individuals. More specifically, the invention relates to continuously authenticating individuals using biometric authentication information.

BACKGROUND OF THE INVENTION

In a variety of situations, authenticating an individual's identity is desirable. For example, before an individual can access a secured resource (e.g., a secure computer network), the network provider may wish to authenticate data about the individual, such as his identity, his security clearance level, his physical location, etc. In another example, access to a secured facility (e.g., a secured building or a secured room) may require authentication of an individual's identity. In some instances, an individual may need to be identified on a continuing basis.

Further, obtaining authentication information to authenticate an individual may be difficult if the individual is wearing personal protective equipment (PPE), e.g., gloves, goggles, masks, hats, chemical and/or bio-hazard equipment, etc. In many of these situations, the individual may not be able to remove the PPE in order to provide the authentication information.

SUMMARY

Systems and methods consistent with the present invention provide a new capability for continuously authenticating individuals using biometric authentication information. Systems and methods consistent with the present invention allow an individual to be authenticated without interrupting the individual's workflow, even if the individual is wearing PPE.

Further, systems and methods consistent with the present invention include a device that receives first and second biometric authentication information from an individual. The device may be linked to the individual based on the first biometric authentication information. The device may also continuously receive the second biometric authentication information from the individual. This information may be processed by the device or sent to another device for processing, in order to continuously authenticate the individual. The first and second biometric authentication information may be different types of biometric authentication information. For example, the biometric authentication information may include one or more of an individual's fingerprint, iris scan, facial image, electrocardiogram (ECG), skin tone, subdermal biomarkers, skin characteristics, breathing rate, oxygen content, blood pressure, skin conductivity, etc.

Some embodiments of the present invention provide a radiation source and sensor to spectroscopically analyze molecules on an individual's skin or in an individual's body so as to continuously authenticate the individual. The radiation source may be calibrated to irradiate the individual with radiation of a wavelength that targets a particular molecule. Similarly, the radiation sensor may be calibrated to detect a reflection within a wavelength range that targets a particular molecule. For example, in some embodiments, the radiation source and sensor may be calibrated at different wavelengths within the visible light, infrared, and/or near-infrared spectrums. In other embodiments, the radiation source may irradiate an individual at a range of wavelengths and may use information related to a spectral pattern of reflection and/or absorbance in order to authenticate the individual.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 5A is a top view of an exemplary continuous authentication device, consistent with embodiments of the present invention.

FIG. 5B is a bottom view of an exemplary continuous authentication device, consistent with embodiments of the present invention.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Figure 1:
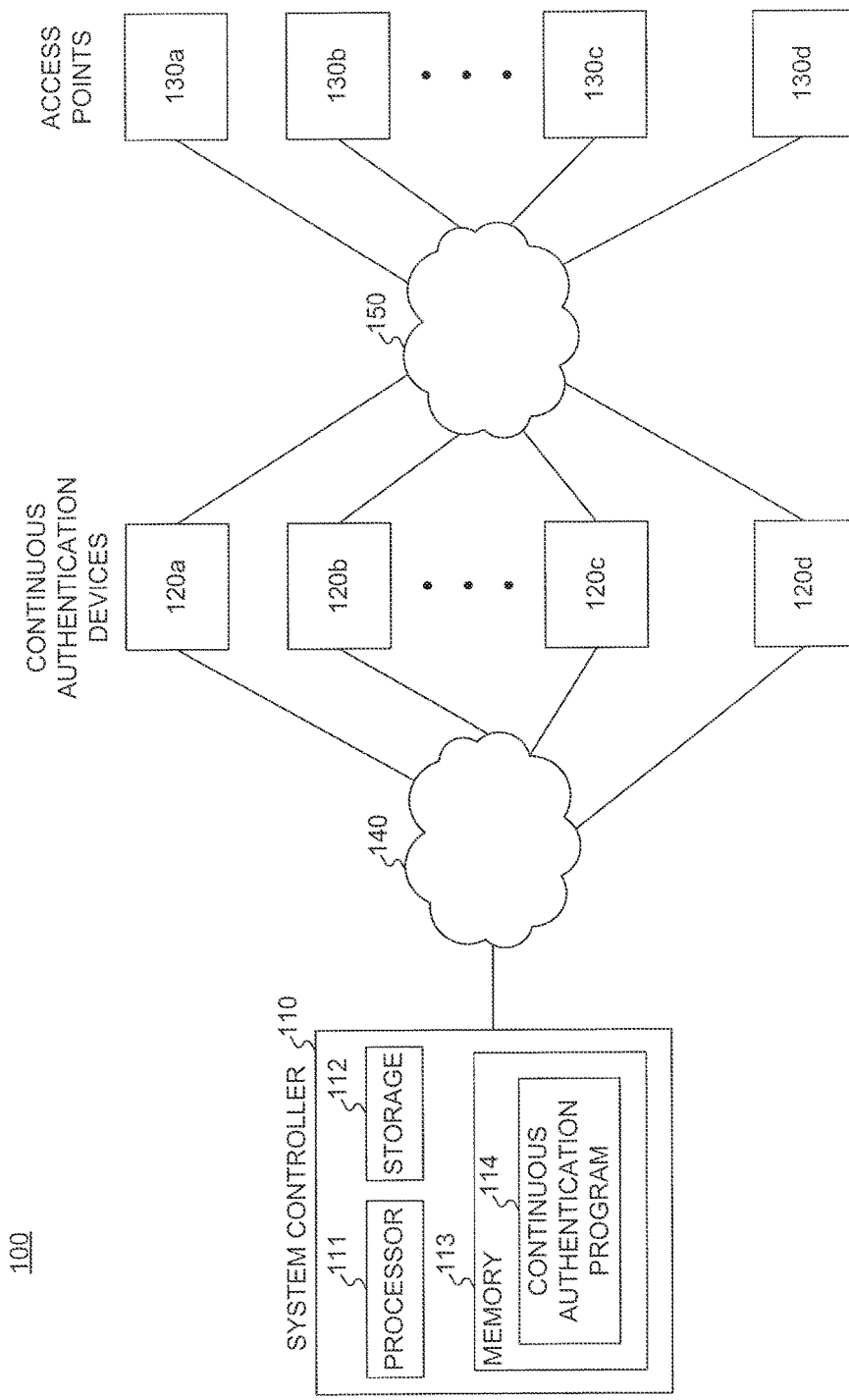
FIG. 1 is a diagram of a continuous authentication system, consistent with embodiments of the present invention.

FIG. 1 is a diagram of a continuous authentication system 100, consistent with embodiments of the present invention.

The components and arrangements in continuous authentication system 100 may be varied.

Continuous authentication system 100 may include system controller 110, continuous authentication devices 120, and access points 130 connected by one or more networks, such as networks 140 and 150, for example. Access points 130 may be located in a secured area or located at entry ways or checkpoints for a secured area. For example, in some embodiments, access points 130 may control access to a secured computer or to an entry way to a secured area. Continuous authentication devices 120 may each be linked to an individual and may continuously obtain authentication information to authenticate the individual on a continuing basis. For example, in certain embodiments, continuous authentication devices 120 may be worn under or may be integrated into an individual's PPE so that continuous authentication can be performed without removing the PPE. Thus, continuous authentication devices 120 may collect biometric information periodically, in real-time, for example.

Although four continuous authentication devices 120a, 120b, 120c, and 120d are depicted in FIG. 1, any number of continuous authentication devices may be included in continuous authentication system 100. Each continuous authentication device 120 may be linked to an individual and may continuously collect authentication information from the individual. For example, continuous authentication devices 120 may include one or more sensors to collect biometric authentication information regarding one or more of, e.g., an individual's fingerprint, iris scan, facial image, ECG, skin tone, subdermal biomarkers, skin characteristics, breathing rate, oxygen content, blood pressure, skin conductivity, etc.

Each continuous authentication device 120 may use the biometric authentication information collected from the individual to authenticate the individual's identity. For example, in some embodiments, continuous authentication device 120a may store previously collected biometric data that corresponds to the individual with whom continuous authentication device 120a is linked. As continuous authentication device 120a continuously collects biometric authentication information from the individual, it may perform biometric authentication analysis, comparing the biometric authentication information it collects to the stored biometric data. This analysis may be used to determine if the individual that continuous authentication device 120a is testing is, in fact, the individual to whom continuous authentication device 120a is linked. For example, if the individual that is being tested is not the individual to whom continuous authentication device 120a is linked, it may be determined that there is a security risk. This process will be described in greater detail below.

Continuous authentication system 100 may also include system controller 110. System controller 110 and continuous authentication devices 120 may communicate with each other via network 140. For example, if continuous authentication device 120a determines that the individual from whom it is collecting information is not the individual to whom it is linked, continuous authentication device 120a may send an error message to system controller 110.

Also, in some embodiments, continuous authentication device 120a may send the biometric authentication information it collects to system controller 110. System controller 110 may then perform biometric authentication analysis to determine if the individual from whom the biometric authentication information was collected is the correct individual. This process will be described in greater detail below.

In some embodiments, system controller 110 may include a processor 111, a nonvolatile storage 112, a memory 113, and input/output (I/O) devices (not shown). System controller 110 may be a general purpose computer, a server, a mainframe computer, or any combination of these components.

Processor 111 may be one or more known processing devices, such as a microprocessor from the Pentium™ or Xeon™ family manufactured by Intel™, the Turion™ family manufactured by AMD™, or any of various processors manufactured by Sun Microsystems. Memory 113 may be one or more storage devices configured to store information used by processor 111 to perform certain functions related to disclosed embodiments. Storage 112 may be a volatile or non-volatile, magnetic, semiconductor, tape, optical, removable, nonremovable, or other type of storage device or computer-readable medium.

In some embodiments, memory 113 may include one or more continuous authentication programs loaded from storage 112 or elsewhere that, when executed by system controller 110, perform various procedures, operations, or processes consistent with disclosed embodiments.

Methods, systems, and articles of manufacture consistent with disclosed embodiments are not limited to separate programs or computers configured to perform dedicated tasks. For example, memory 113 may be configured with continuous authentication program 114 that performs several functions when executed by processor 111. For example, memory 113 may include a single program 114 that performs functions of the continuous authentication system, or program 114 may comprise multiple programs. Moreover, as described in greater detail with regard to FIG. 2, continuous authentication device 120 may also include programs that perform functions related to continuous authentication.

System controller 110 may include one or more I/O devices (not shown) that allow data to be received and/or transmitted by system controller 110. I/O devices may also include one or more digital and/or analog communication input/output devices that allow system controller 110 to communicate with other machines and devices, such as continuous authentication devices 120, access points 130, and/or user computers (not shown). The configuration and number of input and/or output devices incorporated in I/O devices may vary as appropriate for certain embodiments.

Although four continuous access points 130a, 130b, 130c, and 130d are depicted in FIG. 1, any number of access points may be included in continuous authentication system 100. Access points 130 may include physical access points, e.g., a locked doorway, and/or electronic access points, e.g., a secure computer network. Continuous authentication devices 120 may communicate with access points 130 via network 150. For example, if continuous authentication device 120a determines that the individual from whom it is collecting biometric authentication data is the individual to whom it is linked, continuous authentication device 120a may communicate with access point 130c indicating that the individual has been authenticated. Upon receiving information that the individual has been authenticated, access point 130c may grant the individual access, for example.

Networks 140 and 150 may include any one of or combination of wired or wireless networks. For example, networks 140 and 150 may include wired networks such as twisted pair wire, coaxial cable, optical fiber, and/or a digital network. Likewise, networks 140 and 150 may include any wireless networks such as radio frequency identification (RFID), microwave or cellular networks or wireless networks employing, for example, IEEE 802.11 or Bluetooth protocols. Additionally, networks 140 and 150 may be integrated into any local area network, wide area network, campus area network, or the Internet.

In some embodiments, networks 140 and 150 may be a single network. For example, networks 140 and 150 may be combined in a single network that connects system controller 110, continuous authentication devices 120, and access points 130. Further, in some embodiments, another network (not shown in FIG. 2) may directly connect system controller 110 to access points 130.

Figure 2:
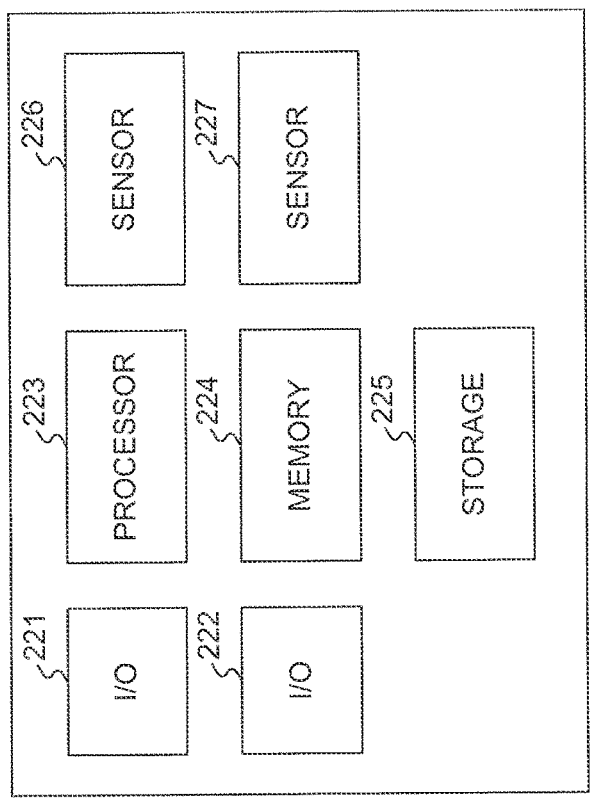
FIG. 2 is a diagram of a continuous authentication device, consistent with embodiments of the present invention.

FIG. 2 is a diagram of a continuous authentication device 120, consistent with embodiments of the present invention. Continuous authentication device 120 may include I/O devices 221 and 222, processor 223, memory 224, storage 225, and sensors 226 and 227, for example. The components and arrangements in continuous authentication device 120 may be varied. For example, while continuous authentication device 120 is shown in FIG. 2 as having two I/O devices 221 and 222 and two sensors 226 and 227, any number of I/O devices and/or sensors may be used.

I/O devices 221 and 222 may be used to communicate with system controller 110 and/or access points 130 via a network. For example, in some embodiments, I/O device 221 may communicate with system controller 110 and I/O device 222 may communicate with access points 130. In one embodiment, I/O device 221 may communicate with system controller 110 using a wireless protocol such as 802.11, for example, and I/O device 222 may communicate with access points 130 using active or passive RFID, for example.

Sensors 226 and 227 may collect biometric authentication information from an individual. For example, sensors 226 and 227 may collect biometric authentication information regarding one or more of, e.g., an individual's fingerprints, iris scan, facial image, ECG, skin tone, subdermal biomarkers, skin characteristics, breathing rate, oxygen content, blood pressure, skin conductivity, etc. In some embodiments, sensors 226 and 227 may include a light source. In some embodiments one or more of sensors 226 and 227 may collect biometric data on a continuing basis.

Processor 223 may be one or more known processing devices, such as a microprocessor from the Pentium™ or Xeon™ family manufactured by Intel™, the Turion™ family manufactured by AMD™, or any of various processors manufactured by Sun Microsystems. Memory 224 may be one or more storage devices configured to store information used by processor 223 to perform certain functions related to disclosed embodiments. Storage 225 may be a volatile or non-volatile, magnetic, semiconductor, tape, optical, removable, nonremovable, or other type of storage device or computer-readable medium.

In some embodiments, memory 224 may include one or more continuous authentication programs loaded from storage 225 or elsewhere that, when executed by processor 223, perform various procedures, operations, or processes consistent with disclosed embodiments. For example, in some embodiments, the programs, when executed, may cause continuous authentication device 120 to collect biometric data via sensors 226 and 227 and store the data.

In some embodiments, continuous authentication device 120 may perform biometric authentication analysis on the data. For example, continuous authentication device 120 may store previously collected biometric information regarding an individual to whom it is linked, and may compare the biometric authentication information it collects to the previously collected biometric information to authenticate the individual. If the individual is authenticated, continuous authentication device 120 may communicate this information with system controller 110 and/or access points 130. Similarly, if the individual is not authenticated, continuous authentication device 120 may communicate this information with system controller 110 and/or access points 130.

In other embodiments, continuous authentication device 120 may continuously collect biometric authentication information via one or more of the sensors 226 and 227 and send the biometric authentication information to system controller 110 via I/O device 221 or 222. In these embodiments, system controller 110 may perform the biometric authentication analysis. For example, system controller 110 may store previously collected biometric information and compare the biometric authentication information received from continuous authentication device 120 to the previously collected biometric information to authenticate the individual. System controller 110 may communicate a result of the analysis with continuous authentication device 120 and/or access points 130.

Figure 3:
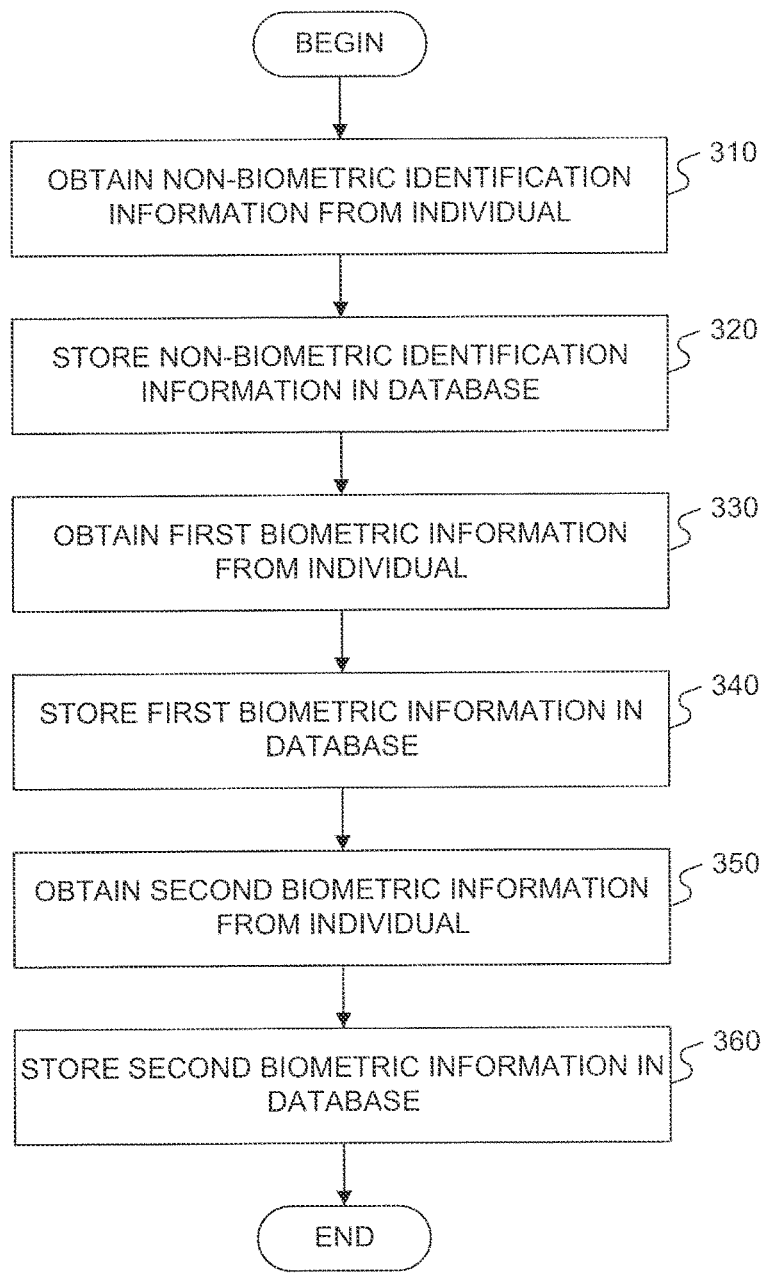
FIG. 3 is a flowchart of a biometric authentication information acquisition process, consistent with embodiments of the present invention.

As discussed above, system controller 110 and/or continuous authentication device 120 may store previously collected biometric information regarding an individual to use in authenticating the individual. FIG. 3 is a flowchart 300 of a biometric information acquisition process, consistent with embodiments of the present invention. The process may be used for acquiring and storing the previously collected biometric information into a database so that it can be compared with the biometric authentication information that is collected by continuous authentication device 120. For example, the exemplary process described in flowchart 300 may be performed by a system administrator or security supervisor when an individual is initially given access to a secure facility. Additionally, the exemplary process described in flowchart 300 may also be performed at different time intervals, e.g. yearly, monthly, etc., to acquire a recent sample of biometric information from the individual.

The process begins at step 310 where non-biometric identification information is collected from the individual. For example, the individual may be required to present an identification card, driver's license, employee number, password, etc., to verify the individual's identity. At step 320 the non-biometric identification is stored in a database. For example, the non-biometric identification information may be stored in a database at system controller 110, continuous authentication devices 120, or elsewhere.

At step 330 first biometric information is obtained from the individual. For example, first biometric information may include information regarding one or more of, e.g., an individual's fingerprints, iris scan, facial image, ECG, skin tone, subdermal biomarkers, skin characteristics, breathing rate, oxygen content, blood pressure, skin conductivity, etc. This information may be collected by one or more sensors capable of gathering such data. For example, in some embodiments, sensors 226 and/or 227 may be used to collect the first biometric information. In other embodiments, separate devices may be used to collect the first biometric information.

At step 340, first biometric information is stored in a database. For example, the first biometric information may be stored in the same database as the non-biometric identification information, so that the first biometric information for a certain individual corresponds to the non-biometric identification information for that individual.

At step 350 second biometric information is obtained from the individual. For example, second biometric information may include information regarding one or more of, e.g., an individual's fingerprints, iris scan, facial image, ECG, skin tone, subdermal biomarkers, skin characteristics, breathing rate, oxygen content, blood pressure, skin conductivity, etc. This information may be collected by one or more sensors capable of gathering such data. For example, in some embodiments, sensors 226 and/or 227 may be used to collect second biometric information. In other embodiments, separate devices may be used to collect the second biometric information.

At step 360 second biometric information is stored in a database. For example, the second biometric information may be stored in the same database as the non-biometric identification information and the first biometric information, so that the second biometric information for a certain individual corresponds to the non-biometric identification information and the first biometric information for that individual.

Flowchart 300 describes acquiring first and second biometric information. However, a skilled artisan will understand that this process may be adapted to acquire any number of different types of biometric information, as appropriate for the specific embodiment. The exemplary process described in flowchart 300 may be used to generate a database that links an individual, based on non-biometric identification information, to one or more biometric information indicators. Further, this exemplary process may be performed for each individual in a given population or group so as to associate each individual with corresponding biometric information. This information may be stored and compared to biometric authentication information that is collected from an individual in order to authenticate that individual's identity.

Figure 4:
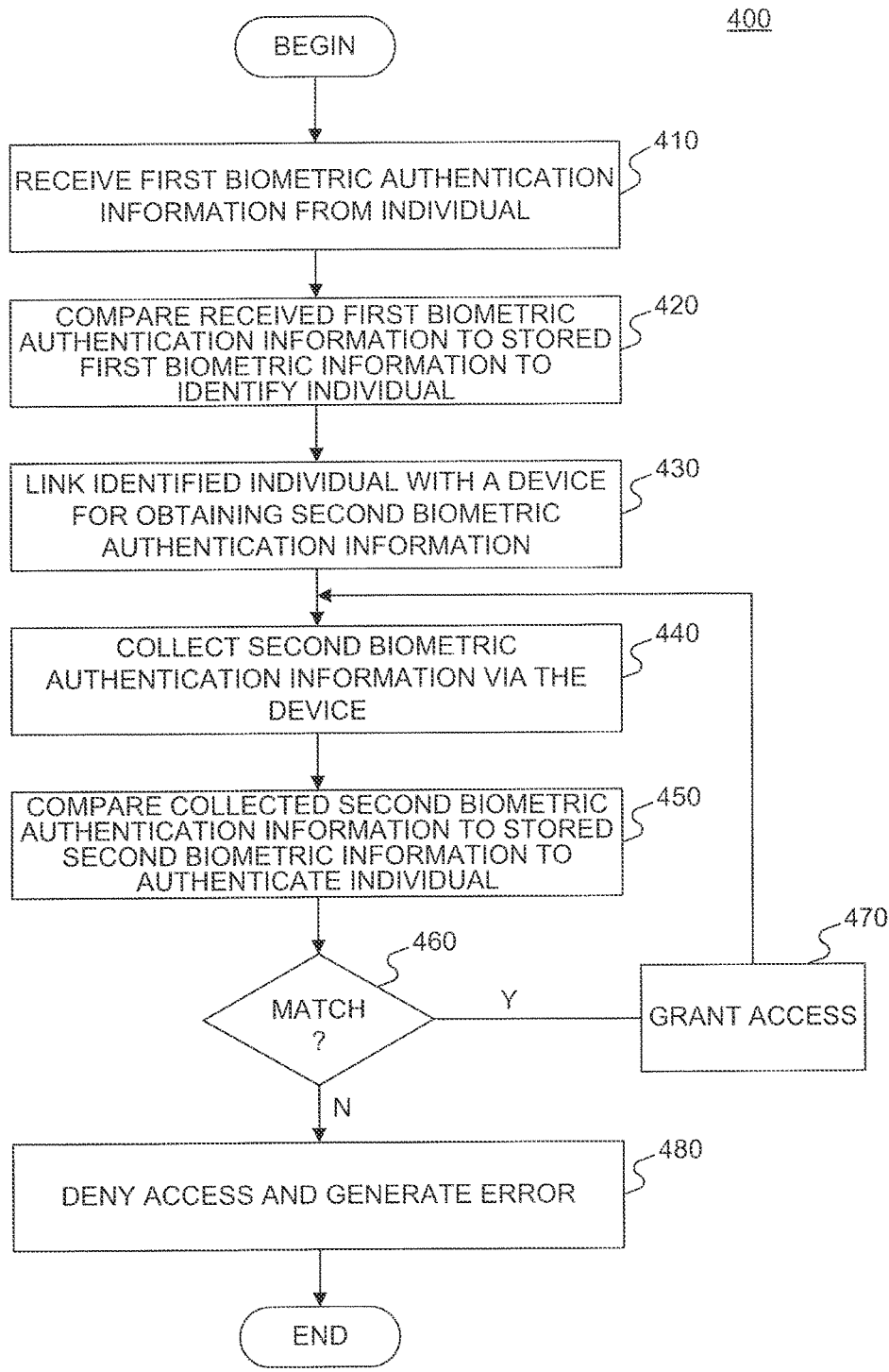
FIG. 4 is a flowchart of a continuous biometric authentication process, consistent with embodiments of the present invention.

FIG. 4 is a flowchart 400 of a continuous biometric authentication process, consistent with embodiments of the present invention. The exemplary process described in flowchart 400 may be performed by continuous authentication devices 120 and/or by continuous authentication system 100, for example.

The process begins at step 410 where first biometric authentication information is received from an individual. For example, continuous authentication device 120a may receive first biometric authentication information in the form of the individual's fingerprint, iris scan, facial image, ECG, skin tone, subdermal biomarkers, skin characteristics, breathing rate, oxygen content, blood pressure, skin conductivity, etc. Continuous authentication device 120 may receive the first biometric authentication information via one or more sensors such as sensors 226 and 227, for example.

In some embodiments, the first biometric authentication information may be strong biometric authentication information, such as a fingerprint, iris scan, or facial image, for example. Strong biometric authentication information may be a biometric authentication information that can identify an individual with high probability, even among a large population. For example, each individual's fingerprint, iris scan, or facial image may be sufficiently unique so that an individual can be identified by these biometrics with a high probability, even if there is a large population of other individuals from which to choose.

At step 420 the first biometric authentication information is compared to corresponding stored biometric authentication information in order to identify the individual. For example, as discussed above with regard to FIG. 3, system controller 110 and/or continuous authentication device 120 may store previously collected biometric information corresponding to an individual in a database. System controller 110 and/or continuous authentication device 120 may compare the first biometric authentication information collected in step 410 to the biometric information stored in the database to identify the individual. The process proceeds to step 430.

In step 430, based on the identification in step 420, the identified individual may be linked with a device for obtaining second biometric authentication information. In some embodiments, the device for obtaining second biometric authentication information may be continuous authentication device 120. For example, continuous authentication device 120 may be linked to the individual electronically, e.g., via a database, such as the database associating the individual with the previously collected biometric information. The individual may also be linked physically to the device, for example, by attaching the device to the individual or to an article of the individual's clothing, such as the individual's PPE, for example. The process proceeds to step 440.

In step 440, second biometric authentication information is collected via the device that is linked to the individual. For example, if continuous authentication device 120 is linked to the individual, continuous authentication device 120 would collect the second biometric authentication information. The second biometric authentication information may be, e.g., an individual's fingerprint, iris scan, facial image, ECG, skin tone, skin characteristics, subdermal biomarkers, breathing rate, oxygen content, blood pressure, skin conductivity, etc. In some embodiments, the second biometric authentication information may be the same type of biometric information as the first biometric authentication information. In other embodiments, the second biometric authentication information may be of a different type than the first biometric authentication information.

Further, in some embodiments, the first biometric authentication information may be strong biometric authentication information, such as a fingerprint, iris scan, or facial image, and the second biometric authentication information may be weaker biometric authentication information than the first biometric authentication information. In some embodiments, the weaker second biometric authentication information may include ECG, skin tone, subdermal biomarkers, breathing rate, oxygen content, blood pressure, skin conductivity, etc. However, in some embodiments, the second biometric information, including, e.g., ECG, skin tone, and subdermal biomarkers may not necessarily be weaker than the first biometric authentication information and may even be considered strong biometric authentication information.

In step 450 the second biometric authentication information that was collected is compared to the stored second biometric information that is associated with the individual to whom the device is linked. For example, if continuous authentication device 120 is linked to the individual, continuous authentication device 120 may perform the comparison, or continuous authentication device 120 may transmit the data to system controller 110 and system controller 110 may perform the comparison.

In step 460, it is determined, based on the comparison in step 450, whether the collected second biometric authentication information matches the stored second biometric information associated with the individual that was linked to the device in step 430. If, at step 460, it is determined that the information is a match, the process proceeds to step 470 where the individual is granted access to the access points 130.

The individual may be granted access at step 470 in a variety of different ways. For example, in some embodiments, continuous authentication device 120 may include an active or passive RFID capable of communicating with RFID readers at the various access points 130. When the individual is granted access in step 470, for example, an active RFID may be enabled to emit continuously an authentication signal that may be received by the RFID readers at the access points 130 when the individual is within a predetermined distance, e.g., three feet, five feet, etc. In other embodiments, the active RFID in the continuous authentication device 120 may be enabled to emit an authentication signal when a) the individual is granted access and/or the individual is within a predetermined distance from the access point. Similarly a passive RFID may be activated so that it can be energized when within a predetermined distance of access points 130.

In some embodiments, continuous authentication devices 120 may communicate with one or more access points 130 using a wireless transfer protocol, e.g., 802.11, Bluetooth, etc. For example, an individual wearing continuous authentication device 120a may request access to access point 130b. In response, access point 130b may query the continuous authentication device 120a to provide it with a password for entry. If the individual is granted access at step 470, continuous authentication device 120a may provide the password to access point 130b. However, if the individual is not granted access, continuous authentication device 130b may not provide the password.

System controller 110 may also grant access in step 470. For example, as discussed above, system controller 110 may perform the comparison and authentication in steps 450 and 460. Thus, if the collected second biometric authentication information matches the stored second biometric information, system controller 110 may communicate with access points 130 to grant the individual access. For example, system controller may send instructions to access point 130b to grant access to the individual linked to continuous authentication device 120a in response to the individual's request for access to access point 130b.

From step 470, the process returns to step 440, where the second biometric authentication information is again collected via the device, and then to step 450, where the collected second biometric authentication information is compared to stored second biometric information. This way, the process continuously acquires biometric information and compares it to the stored biometric information to authenticate the individual on a continuing basis.

In some embodiments, the continuous authentication may be such that the process immediately returns to step 440 from step 470, without delay. In other embodiments, the continuous authentication may be such that the process pauses for a predetermined interval of time after step 470, so that authentication, while continuous, is performed at predetermined intervals. These intervals may be customizable, for example.

If, on the other hand, it is determined at step 460 that the collected second biometric authentication information does not match the stored second biometric information, the process proceeds to step 480, where access to the access points is denied and an error is generated. For example, if continuous authentication device 120a includes an active or passive RFID, the RFID may be disabled so it does not emit an authentication signal or may be deactivated so that it cannot be energized when in the vicinity of access points 130. At step 480, an error report may also be generated and may be sent to a user or system administrator, for example, to inform them that there is a possible security threat.

While the exemplary process described in flowchart 400 describes receiving and comparing first biometric authentication information and continuously receiving and comparing second biometric authentication information, a skilled artisan will understand that the method may be modified to include continuously receiving and comparing any number of biometric authentication information. For example, in some embodiments, continuous authentication device 120a may continuously authenticate an individual based on a combination of multiple biometrics, e.g. any combination of fingerprint, iris scan, facial image, ECG, skin tone, subdermal biomarkers, skin characteristics, breathing rate, oxygen content, blood pressure, skin conductivity, etc.

While the processes described above use biometric authentication information to continuously authenticate an individual, the continuously collected biometric authentication information may also be used to determine an individual's state of health and/or state of mind. For example, the continuously collected biometric information may be used to ascertain if an individual is under stress or duress, or is acting in a deceptive way or with some sort of malicious intent. For example, when the continuously collected biometric information is analyzed by the system controller 110 and/or the continuous authentication devices 120 in order to authenticate the individual, the information may also be processed to determine if the individual is in a good state of health and/or if the individual is under duress or acting deceptively.

FIGS. 5A and 5B are top and bottom views, respectively, of an exemplary continuous authentication device 500 that may be used to implement continuous authentication device 120, according to various embodiments of the present invention. For example, continuous authentication device 500 may include some or all of the various components shown in FIG. 2. Some or all of these may be included in center portion 510. For example, center portion 510 may include processor 223, memory 224, storage 225, one or more I/O devices, such as I/O devices 221 and 222, and one or more sensors such as sensors 226 and 227. As shown in FIGS. 5A and 5B, continuous authentication device 500 may be in the shape of a watch-like device that may be worn on an individual's wrist and/or ankles. Straps 550 and 560 may physically link continuous authentication device 500 to the individual.

The sensors may be disposed on the outside of the center portion 510, and may be disposed in various locations, based on the type of sensor. For example, continuous authentication device 500 may include a sensor 520 on the top face of center portion 510. In some embodiments, sensor 520 may be a fingerprint sensor. For example, in some embodiments, an individual may depress a thumb or finger on sensor 520. Sensor 520 may read the fingerprint and use it as biometric authentication information. For example, in some embodiments, sensor 520 may read the fingerprint information and use it as first biometric authentication information for identifying the individual and linking continuous authentication device 500 with the individual, as discussed with respect to steps 410-430 in FIG. 4.

Sensors may also be disposed in other locations on continuous authentication device 500. For example, continuous authentication device 500 may include sensors 540a and 540b disposed on the bottom face of center portion 510, and may include sensor 570 disposed on strap 560. The sensors may be used to sense various biometrics, such as an individual's ECG, skin tone, subdermal biomarkers, skin conductivity, etc. The number and location of sensors 540 may vary as required for a particular embodiment.

For example, in some embodiments, sensors 540a and/or 540b may spectroscopically analyze different molecules in the skin or molecules in the body of an individual in order to authenticate the individual. In some embodiments, the amounts of different molecules in the individual's skin or body may be collected as second biometric authentication information, and an individual may be continuously authenticated based on this information, as discussed with respect to steps 440-470 in FIG. 4. Continuous authentication processes related to spectroscopic analysis are discussed in greater detail below.

Similarly, in some embodiments, sensors 540a and/or 540b may include a light source and light sensor for analyzing various skin characteristics. Such skin characteristics may include, e.g., skin texture, skin defects, other identifying skin anomalies that may be present on an individual, etc.

Further, in some embodiments, sensor 570 may be an electrode lead that is used to gather information regarding an individual's ECG in order to authenticate the individual. Specifically, the individual's ECG may be collected as second biometric authentication information, and an individual may be continuously authenticated based on this information, as discussed with respect to steps 440-470 in FIG. 4. Continuous authentication processes related to ECG analysis are also discussed in greater detail below.

While continuous authentication device 500 has a watch-like shape, other forms may be utilized to implement continuous authentication device 120. For example, in some embodiments, continuous authentication device 120 may include sensitive surface, flexible sensor membranes used to capture fingerprints and/or partial palm prints of an individual on a continuing basis. For example, the flexible sensor membranes may be integrated into or under the fingers, finger tips, and/or palms of gloves that may be worn as part of an individual's PPE. In some embodiments, the individual's fingerprint may be used as first biometric authentication information used to identify the individual, as described in steps 410-430 of FIG. 4, for example, and/or as second biometric authentication information used to continuously authenticate the individual, as described in steps 440-470, for example.

Similarly, in some embodiments, continuous authentication device 120 may include an iris scanner used to capture images of an individual's eye on a continuing basis. For example, the iris scanner may include a digital camera and a near-infrared (NIR) light source that may be integrated into an individual's PPE, such as a protective mask or safety hat. The light source may illuminate the surface of the individual's eye and the digital camera may capture images of the individual's iris. Continuous authentication device 120 and/or system controller 110 may convert the images to digital templates to provide a mathematical representation of the iris. Continuous authentication device 120 and/or system controller 110 may compare the digital templates to stored digital templates to provide continuous authentication of an individual. For example, in some embodiments, the iris scan may be used as first biometric authentication information used to identify the individual, as described in steps 410-430 of FIG. 4, for example, and/or as second biometric authentication information used to continuously authenticate the individual, as described in steps 440-470, for example.

As discussed above, continuous authentication device 120 may include an RFID. In some embodiments, the RFID may provide continuous authentication information in addition to the biometric authentication information. For example, in some embodiments, the RFID of continuous authentication device 120 may be used to provide real-time tracking of an individual's location as well as a history of the individual's movements. This data may be analyzed in multiple ways.

First, the real time data of the individual's location may be used by security personnel to monitor a secured area. For example, error reports may be generated if an individual is in a location unrelated to the task the individual is performing or if the individual stays in a certain location for a lengthy period of time.

Second, the movement data of the individual may be analyzed to determine if there were any sudden movements that may indicate a security breach. For example, a sudden movement of an individual's location may signal that the continuous authentication device was removed, or that the individual's health or safety is at risk. Thus, in response to sudden movements, the individual may be denied access to access points and an urgent error message may be issued.

Third, the movement data of the individual may be analyzed from a point of view of efficiency. For example, if a history of the individual's movements indicate that the individual is required to travel long distances several times to complete a task, this data may be used to reorganize the individual's workspace to reduce travel time.

Figure 6:
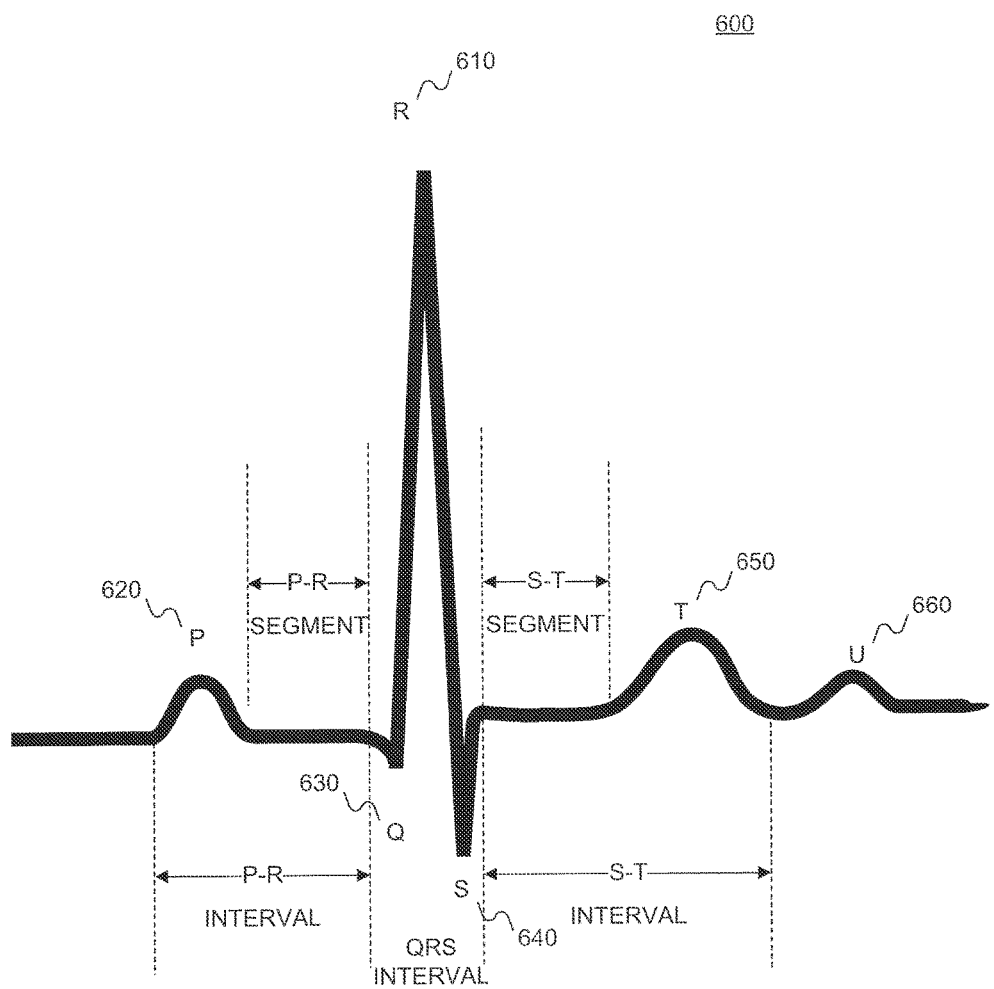
FIG. 6 is an exemplary electrocardiogram that may be collected by one or more of sensors, consistent with embodiments of the present invention.

In some embodiments, data related to an individual's ECG may be collected and analyzed as biometric authentication information. For example, in some embodiments, one or more sensors 540 may be electrodes for detecting an individual's ECG. FIG. 6 shows an exemplary ECG 600 that may be collected by one or more sensors 540, consistent with embodiments of the present invention. ECG 600 may include six separate waves: R wave 610, P wave 620, Q wave 630, S wave 640, T wave 650 and U wave 660. Depending on the number of sensors used and the individual being tested, some or all of these waves may appear on the individual's ECG.

Moreover, while ECG 600 is representative of the general shape of an ECG, each individual in a population may have an ECG with different characteristics. For example, the length of ECG signal time between each of the features denoted in FIG. 6 may vary among individuals. Additionally, the amplitude and shape of each feature, e.g., R wave 610, P wave 620, Q wave 630, S wave 640, T wave 650 and U wave 660 may vary between individuals.

Another interval, not shown in FIG. 6, is the R-R interval. The R-R interval represents the period of time between peaks of consecutive R waves and its statistical moments may vary among individuals. An individual's R-R interval may vary depending on the individual's level of stress or exertion that may further affect the absolute timing between the ECG features. The timing of these features may remain invariant based on the fraction of ECG signal. The individual's ECG features may remain invariant under conditions that increase and decrease heart rate from a baseline measurement and may also remain invariant over time periods exceeding a year.

In certain embodiments, the ECG data may be collected by sensors that are located at different parts of the individual's body. For example, in some embodiments a three-lead ECG may be used where three sensors are placed on the left wrist, the right wrist and either the left or right ankle. In these embodiments, one of the sensors may be a sensor included in continuous authentication device 500. The other two sensors may also be included in separate continuous authentication devices, or may be a part of two simpler devices that include a sensor and a wired or wireless transmitter. These two devices may send information regarding the electrical pulses being sensed for the ECG to the continuous authentication device 500, for example. Further, in some embodiments, one or more sensors may be incorporated into a band placed on an individual's chest. A skilled artisan will understand that other combinations and various placements of sensors may be used to collect ECG information, including two sensors, five sensors, twelve sensors, etc.

The information collected by the sensors may be analyzed and compared to stored ECG data to authenticate the individual. The comparison of the collected ECG data and the stored ECG data may be performed as part of steps 450 and 460 as shown in FIG. 4, for example. In some embodiments, the comparison may include parameterizing the continuously monitored ECG signal by analyzing the statistical moments of the R-R interval through detrended fluctuation analysis, wavelet filtering techniques, or Feynman variance techniques. Further, the shape of the ECG may also be parameterized through filtering techniques to expand the heart rate parameterization. The ECG may then be mapped in n-dimensional phase space and applied to an adaptive learning formulation, e.g., a support vector machine linear regression analysis, etc. Based on this analysis it may be determined, for example, at step 460, whether the individual whose ECG is being measured is the individual to whom the continuous authentication device 500 is linked. This way, the individual may be authenticated on a continuing basis using the ECG signal.

In some embodiments, data related to an individual's skin tone may be collected and analyzed as biometric authentication information. For example, in some embodiments, continuous authentication device 500 may spectroscopically analyze the absolute and relative amounts of different types of melanin present in a person's skin.

Melanin is the primary contributor to skin color. Melanin can be broken down into three types: phaeomelanin (red color), brown eumelanin (brown color), and black eumelanin (black color). To the unaided eye, these three separate types of melanin merge to one composite skin-tone color. However, each of the three types of melanin has different spectroscopic characteristics. Thus, continuous authentication device 500 may use spectroscopic methods to determine the absolute and relative amounts of each type of melanin.

More specifically, when radiation, such as light, of a certain wavelength is irradiated on a specific type of melanin, the molecular structure of that type of melanin may cause it to absorb some of the light and reflect some of the light back. The intensity and wavelength of the light that is reflected and/or absorbed depend on the molecular structure of the melanin and are thus different for each type of melanin. Further, the wavelength of the light that is irradiated on the melanin may also affect the intensity and wavelength of the reflection and absorbance patterns. In other words, the same type of melanin may reflect and/or absorb light of a different spectral characteristic for irradiated light with a wavelength $\lambda 1$ than for irradiated light with a wavelength $\lambda 2$. Thus, for each type of melanin to be tested, it may be desirable to determine the peak irradiation wavelength (i.e. the wavelength of light that, when irradiated on the type of melanin, maximizes the reflection intensity from the type of melanin), and the peak detection wavelength band (i.e. the wavelength band of light in which the type of melanin reflects or absorbs with the highest intensity when irradiated at the peak irradiation wavelength). Determining the peak irradiation wavelength and detection wavelength band for the various types of melanin is described in greater detail below with respect to FIG. 7.

To measure the different types of melanin present in an individual's skin, continuous authentication device 500 may include a wavelength-adjustable light source as one sensor, such as sensor 540a in FIG. 5B, for example, and a wavelength-adjustable light sensor as another sensor, such as sensor 540b, for example. In some embodiments, the light source and the light sensor may be integrated into a single sensor. The absolute amount of each type of melanin in the individual's skin may be determined by irradiating the skin at the peak irradiation wavelength of the specific type of melanin and detecting a reflection and/or absorbance within the peak detection wavelength band of the given type. This can then be repeated for each type of melanin to determine both the absolute amount and the relative amount of the types of melanin. For example, the absolute amounts of the different types of melanin may be represented as an intensity value of reflected and/or absorbed light and/or as a percentage value that represents the percentage of the irradiated light that is reflected and/or absorbed. Detecting the intensity to determine the amount of each type of melanin is described in greater detail below with respect to FIG. 8.

The individual may then be authenticated based on the determined absolute and relative amounts of the types of melanin. For example, system controller 110 and/or continuous authentication device 500 may store previously collected biometric information for the individual to whom continuous authentication device 500 is linked. This biometric information may include, for example, the absolute and relative amounts of different types of melanin in the individual's skin. System controller 110 and/or continuous authentication device 500 may compare the stored absolute and/or relative amounts of different types of melanin to the measured absolute and/or relative amounts of different types of melanin to authenticate the individual. For example, if the differences between measured amounts and the stored amounts are within a predetermined threshold, the individual may be authenticated. In some embodiments, system controller 110 and/or continuous authentication device 500 may authenticate the individual on a continuing basis as described with respect to steps 440-470 in FIG. 4.

The predetermined threshold for authenticating the individual may be customizable by, e.g., a system administrator. In some embodiments, the predetermined threshold may be set based on the size of the population that has been granted access to the access points. For example, if the size of the population is smaller, the threshold may be increased. On the other hand, if the size of the population is larger, the threshold may be decreased.

In some embodiments, data related to an individual's subdermal biomarkers may be collected and analyzed as biometric authentication information. For example, in some embodiments, continuous authentication device 500 may spectroscopically analyze the absolute and relative amounts of different subdermal biomarkers present in an individual's body using near-infrared (NIR) and/or infrared (IR) spectroscopy.

Subdermal biomarkers may include various molecules within an individual's body, such as in the individual's bloodstream, for example, that may be present in relatively stable amounts, so as to be used to identify an individual. Examples of different subdermal biomarkers may include, for example, albumin, alpha 1 antitrypsin, alpha 2 macroglobulin, bicarbonate, blood urea nitrogen (BUN), carbon dioxide, cephalin, ceruloplasmin, chloride, choline, fibrinogen, glucosamine, glucose, haptoglobin, iron, lecithin, magnesium, phosphorus, potassium, prothrombin, sodium, sulfur, thyroxin binding prealbumin, transferrin, urea, uric acid, etc.

Similar to the discussion of detecting different types of melanin, when radiation of a certain wavelength is irradiated on a molecule such as a subdermal biomarker, the molecular structure of that subdermal biomarker may cause it to absorb some of the radiation and reflect some of the radiation. The intensity and the wavelength of the radiation that is reflected and/or absorbed depend on the molecular structure of the subdermal biomarker and are thus different for each type of subdermal biomarker. Further, the wavelength of the radiation that is irradiated on the subdermal biomarker may also affect the intensity and wavelength of the reflection and/or absorbance. In other words, the same type of subdermal biomarker may reflect and/or absorb radiation of a different spectral characteristic for irradiated IR or NIR with a wavelength λ1 than for irradiated IR or NIR with a wavelength λ2. Thus, for each type of subdermal biomarker to be tested, it may be desirable to determine the peak irradiation wavelength (i.e. the wavelength of IR or NIR that, when irradiated on the subdermal biomarker, maximizes the reflection intensity from the subdermal biomarker), and the peak detection wavelength band (i.e. the wavelength band of IR or NIR within which the subdermal biomarker reflects and/or absorbs at the highest intensity when irradiated at the peak irradiation wavelength). Determining the peak irradiation wavelength and detection wavelength band for the various types of subdermal biomarkers is described in greater detail below with respect to FIG. 7.

To measure the different types of subdermal biomarkers present in an individual's body, continuous authentication device 500 may include a wavelength-adjustable radiation source as one sensor, such as sensor 540a, for example, and a wavelength-adjustable radiation sensor as another sensor, such as sensor 540b, for example. The radiation source and the radiation sensor may be capable of emitting and sensing radiation in the NIR and/or IR spectrums, for example. In some embodiments, the radiation source and the radiation sensor may be integrated into a single sensor.

The absolute amount of a subdermal biomarker in the individual's skin may be determined by irradiating the skin at a wavelength corresponding to the peak irradiation wavelength of the subdermal biomarker and detecting a reflection and/or absorbance at the peak detection wavelength band of the subdermal biomarker. This may then be repeated for each subdermal biomarker to be analyzed to determine both the absolute amount and the relative amount of the different subdermal biomarkers. For example, the absolute amounts of the different types of subdermal biomarkers may be represented as an intensity value of reflected and/or absorbed radiation and/or as a percentage value that represents the percentage of the radiation that is reflected and/or absorbed. Detecting the intensity to determine the amount of each type of subdermal biomarker is described in greater detail below with respect to FIG. 8.

The individual may then be authenticated based on the determined absolute and relative amounts of the types of subdermal biomarkers. For example, system controller 110 and/or continuous authentication device 500 may store previously collected biometric information for the individual to whom continuous authentication device 500 is linked. This biometric information may include, for example, the absolute and relative amounts of different types of subdermal biomarkers in the individual's body. System controller 110 and/or continuous authentication device 500 may compare the stored absolute and/or relative amounts of different types of subdermal biomarkers to the measured absolute and/or relative amounts of different types of subdermal biomarkers to authenticate the individual. For example, if the difference between the measured amounts and the previously collected amounts is within a predetermined threshold, the individual may be authenticated. In some embodiments, system controller 110 and/or continuous authentication device 500 may authenticate the individual on a continuing basis as described with respect to steps 440-470 in FIG. 4.

In some embodiments, IR or NIR may be irradiated on an individual over a broad range of wavelengths and IR or NIR reflection and/or absorbance spectra of the individual's blood may be collected over the range of wavelengths. The spectral pattern may be collected continuously in order to continuously authenticate an individual, for example. Thus, instead of authenticating an individual by the relative and absolute amounts of specific, identified biomarkers, the individual may be authenticated using the reflection and/or absorbance spectra over the multiple wavelengths included in the range, without requiring full knowledge of the identity of each biomarker. The spectral pattern of the reflection and/or absorbance spectra that may be obtained may result in numerous peaks of differing height. Some of the peaks may be influenced by a number of factors, e.g., health or nutritional status, etc. However, some of the peaks will have frequency and intensity characteristics that remain relatively stable for a given individual over a period of time. Further, the pattern of the stable peaks may vary among individuals.

Thus, the pattern of the stable peaks may also be used to authenticate an individual by comparing the continuously collected spectra to a previously collected spectra corresponding to the individual. For example, system controller 110 and/or continuous authentication device 500 may store previously collected NIR and/or IR reflection and/or absorbance spectra as biometric information for the individual to whom continuous authentication device 500 is linked. System controller 110 and/or continuous authentication device 500 may compare the stored spectra to the measured spectra to authenticate the individual. For example, if the differences between the stable peaks in the spectra are within a predetermined threshold, the individual may be authenticated. In some embodiments, system controller 110 and/or continuous authentication device 500 may authenticate the individual on a continuing basis as described with respect to steps 440-470 in FIG. 4.

The predetermined threshold for authenticating the individual may be customizable by, e.g., a system administrator. In some embodiments, the predetermined threshold may be set based on the size of the population that has been granted access to the access points. For example, if the size of the population is smaller, the threshold may be increased. On the other hand, if the size of the population is larger, the threshold may be decreased.

Figure 7:
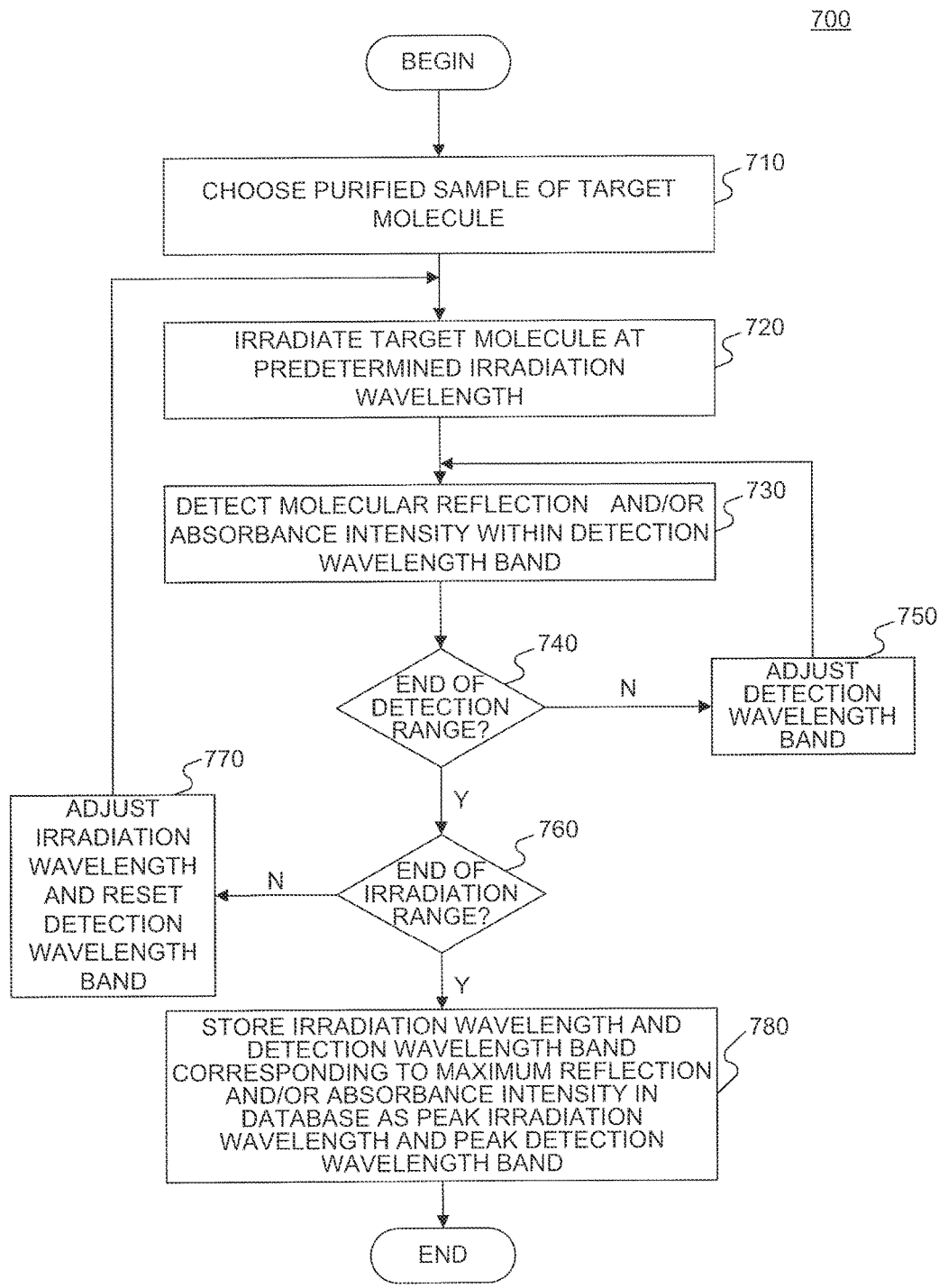
FIG. 7 is a flowchart of a peak irradiation wavelength and peak detection wavelength band determination process, consistent with embodiments of the present invention.

FIG. 7 is a flowchart 700 of a peak irradiation wavelength and peak detection wavelength band determination process, consistent with embodiments of the present invention. The process detects a molecule's spectral output for multiple combinations of irradiation and detection wavelengths to determine the maximum irradiation/detection wavelength combination for a given molecule. The process begins at step 710 where a purified sample of a target molecule is chosen. For example, the target molecule may be one of the types of melanin to be used in determining skin tone or one of the molecules to be used as a subdermal biomarker.

At step 720, the target molecule is irradiated at a predetermined irradiation wavelength. For example, for testing the different types of melanin, visible light radiation may be used. Thus, the predetermined wavelength may begin within the visible spectrum. On the other hand, for testing different subdermal biomarkers, IR or NIR radiation may be used. Thus, the predetermined wavelength may begin within the IR or NIR spectrum.

At step 730, the reflection and/or absorbance from the molecule is detected within a predetermined detection wavelength band. For example, for testing the different types of melanin, the predetermined detection wavelength band may begin within the visible spectrum. On the other hand, for testing different subdermal biomarkers, the predetermined detection wavelength band may begin within the IR or NIR spectrum.

At step 740 it is determined whether the current detection wavelength band is at the end of a predetermined range. For example, the predetermined range for testing different types of melanin may be all or part of the visible light spectrum, while the predetermined range for testing different types of subdermal biomarkers may be all or part of the IR or NIR spectrum. If, at step 740 the current detection wavelength band is not at the end of the range, the process proceeds to step 750 where the wavelength band is adjusted. For example, in some embodiments, the predetermined wavelength band may begin at the shortest wavelength of the predetermined range and may be incrementally increased by a predetermined amount at step 750. The process then returns to step 730, where the reflection and/or absorbance is detected for the updated detection wavelength band.

If, at step 740, it is instead determined that the current detection wavelength band is at the end of the detection wavelength range, the process proceeds to step 760 where it is determined if the current irradiation wavelength is at the end of a predetermined irradiation range. If, at step 760 it is determined that the current irradiation wavelength is not at the end of the predetermined irradiation range, then the process proceeds to step 770 where the irradiation wavelength is adjusted. For example, the predetermined irradiation range for testing different types of melanin may be all or part of the visible light spectrum, while the predetermined irradiation range for testing different types of subdermal biomarkers may be all or part of the IR or NIR spectrum. If, at step 760, the current irradiation wavelength is not at the end of the irradiation range, the process proceeds to step 770 where the irradiation wavelength is adjusted. For example, in some embodiments, the predetermined irradiation wavelength may begin at the shortest wavelength in the predetermined range and may be incrementally increased by a predetermined amount in step 770. At step 770, the detection wavelength band is also reset to the original detection wavelength band. The process then returns to step 720, where the reflection and/or absorbance intensity is detected for the updated irradiation wavelengths and a new set of wavelength bands.

If, at step 760 it is determined that the irradiation wavelength is at the end of the irradiation range, then the process proceeds to step 780. At step 780, the maximum irradiation wavelength and corresponding maximum detection wavelength band are determined from among the various combinations that were used and are stored in a database as the peak irradiation wavelength and peak detection wavelength band for that molecule. Thus, a database may be maintained that includes the peak irradiation wavelength at which a radiation (e.g. visible light, IR, NIR, etc.) source may emit radiation to test for a molecule as well as the peak detection wavelength band at which a sensor should be calibrated to detect radiation being reflected and/or absorbed by the molecule for each molecule to be detected.

Figure 8:
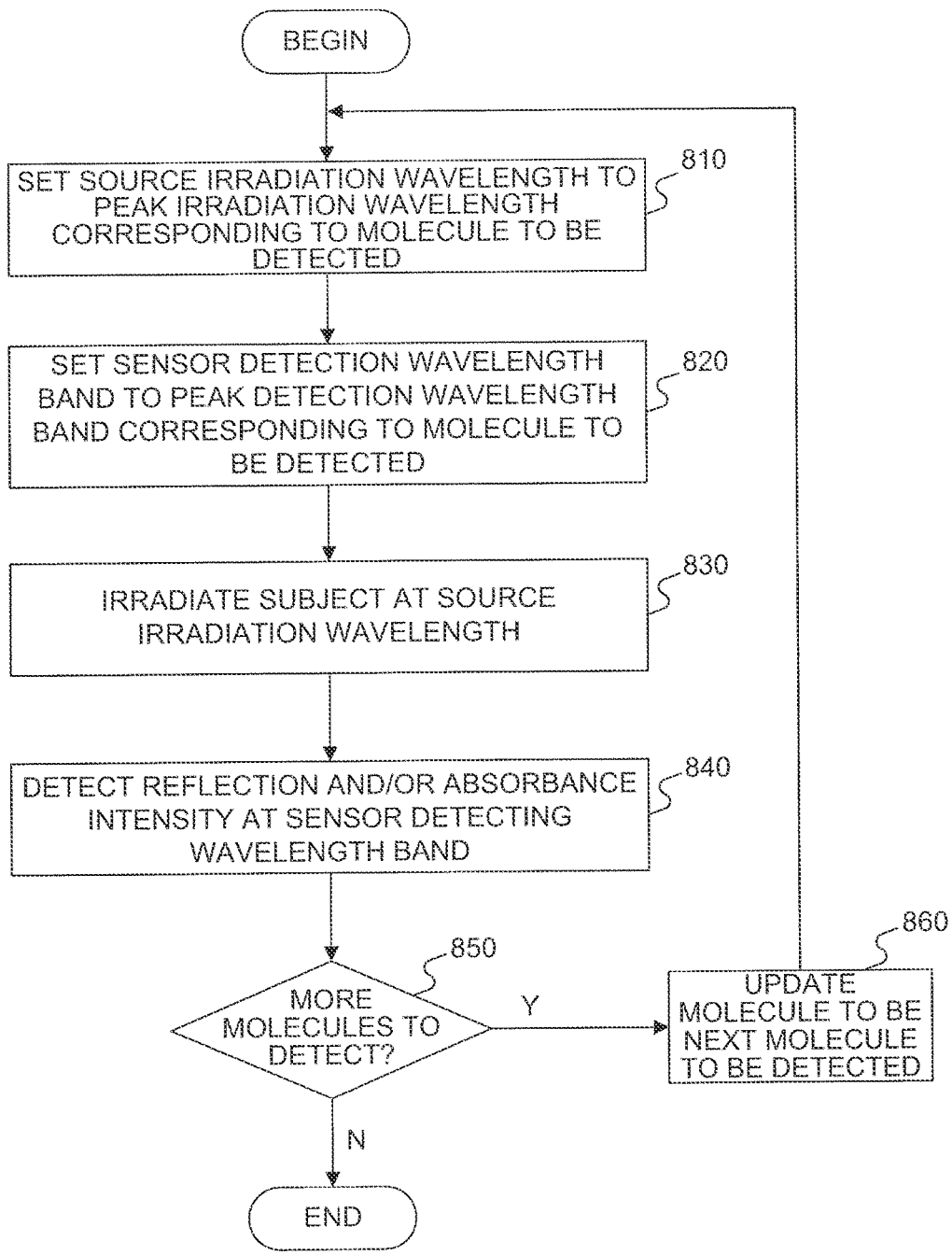
FIG. 8 is a flowchart of a process for consecutively detecting the presence of multiple molecules, consistent with embodiments of the present invention.

FIG. 8 is a flowchart 800 of an exemplary process for consecutively detecting the presence of multiple molecules. For example, the process in flowchart 800 may be performed by continuous authentication device 500 to test for the three different types of melanin and/or to test for multiple subdermal biomarkers.

The process begins at step 810 where the source irradiation wavelength is set to the peak irradiation wavelength corresponding to the molecule to be detected. For example, sensor 540a of continuous authentication device 500 may be a wavelength-adjustable light source, and the current molecule to be detected may be phaeomelanin. Thus continuous authentication device 500 may set the wavelength at which sensor 540a will emit radiation to the peak irradiation wavelength for phaeomelanin. This peak irradiation wavelength may have been previously determined by the process described in flowchart 700 of FIG. 7, for example.

At step 820, the sensor detection wavelength band is set to the peak detection wavelength band corresponding to the molecule to be detected. For example, sensor 540b of continuous authentication device may be a wavelength-adjustable light sensor. Sensor 540b may be calibrated so that the light being detected is constrained to a wavelength band. The wavelength band may correspond to the peak detection wavelength band for phaeomelanin. This peak detection wavelength band may have been previously determined by the process described in flowchart 700 of FIG. 7, for example.

At step 830, the subject to be tested is irradiated at the source irradiation wavelength set in step 810. For example, an individual's skin may be irradiated by sensor 540a with a light having a wavelength corresponding to the peak irradiation wavelength of phaeomelanin.

At step 840, the intensity of the reflection and/or absorbance from the subject being tested within the sensor detecting wavelength band is detected. For example, sensor 540b may detect the intensity of the light reflection and/or absorbance from an individual's skin at the peak detection wavelength for phaeomelanin. At step 840 the detected reflection and/or absorbance may be saved in continuous authentication device 500 and/or at system control 110 to be used to authenticate an individual on a continuing basis.

At step 850, it is determined whether there are additional molecules to detect. For example, if skin color is being tested, as discussed above, the other two types of melanin, brown eumelanin and black eumelanin may be tested. If, at step 850, it is determined that there are additional molecules to test, the process proceeds to step 860 where the molecule to be detected is updated. For example, the molecule to be detected may be updated to be brown eumelanin. The process then returns to step 810 where steps 810-840 are repeated for the next molecule.

If, at step 850, it is determined that there are no more molecules to detect, the process ends. The detected reflection and/or absorbance intensities for each molecule may be used to continuously authenticate an individual. For example, these intensities may be used as second biometric authentication information in accordance with the process described in flowchart 400 of FIG. 4.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of continuously authenticating an individual, comprising:
acquiring first biometric authentication information from an individual;

comparing the acquired first biometric authentication information to stored first biometric information to identify the individual;

linking the identified individual with a device carried by the individual, the device including a wavelength-adjustable light source and a wavelength-adjustable light sensor for acquiring second biometric authentication information from the individual;

continuously acquiring second biometric authentication information from the individual using the wavelength-adjustable light source and the wavelength-adjustable light sensor of the device, wherein continuously acquiring includes:

irradiating, by the wavelength-adjustable light source, a skin part of the individual at a peak irradiation wavelength corresponding to a skin molecule; and detecting, by the wavelength-adjustable light sensor, within a peak detection wavelength band corresponding to the skin molecule, at least one of an intensity of reflection or an intensity of absorbance associated with the irradiated skin part;

comparing the continuously acquired second biometric authentication information, acquired in accordance with the irradiating and the detecting at least one of the intensity of reflection or the intensity of absorbance, to stored second biometric information which includes stored data related to the skin molecule that corresponds to the identified individual; and authenticating the identified individual based on the comparison.

2. The method of claim 1, further comprising: enabling the identified individual to access a secured access point if the identified individual is authenticated based on the continuously acquired second biometric authentication information.

3. The method of claim 1, wherein:
the acquired first biometric authentication information is strong biometric authentication information; and
the continuously acquired second biometric authentication information is weaker biometric authentication information than the acquired first biometric information.

4. The method of claim 1, wherein:
the device further includes an electrocardiogram electrode configured to continuously acquire information related to an electrocardiogram; and
the continuously acquired second biometric authentication information further includes information related to the electrocardiogram.

5. The method of claim 1, where:
comparing the continuously acquired second biometric authentication information to the stored second biometric information includes:
determining that the continuously acquired second biometric authentication information corresponds to the identified individual if a difference between at least one of an absolute amount or a relative amount and the stored data is within a predetermined threshold value.

6. The method of claim 5, where:
the skin molecule is a type of melanin; and
the peak irradiation wavelength is within the visible light spectrum.

7. The method of claim 5, wherein:
the continuously acquired second biometric authentication information includes information related to subdermal biomarkers; and
the peak irradiation wavelength is within the infrared or near-infrared spectrum.

8. A continuous authentication device for continuously authenticating an individual, comprising:
a first sensor configured to acquire first biometric authentication information from an individual;
a wavelength-adjustable light source configured to irradiate a skin part of the individual at a peak irradiation wavelength corresponding to a skin molecule;
a second sensor configured to continuously acquire second biometric authentication information from the individual who carries the continuous authentication device, the second sensor including a wavelength-adjustable light sensor configured to detect, within a peak detection wavelength band corresponding to the skin molecule, at least one of an intensity of reflection or an intensity of absorbance associated with the irradiated skin part;
a processor; and
a memory including instructions that, when executed by the processor, causes the processor to:
compare the acquired first biometric authentication information to stored first biometric information to identify the individual;
link the identified individual to the continuous authentication device based on the acquired first biometric information;
compare the continuously acquired second biometric authentication information, acquired in accordance with the irradiating and the detecting at least one of the intensity of reflection or the intensity of absorbance, to stored second biometric information which includes stored data related to the skin molecule that corresponds to the identified individual; and
authenticate the identified individual based on the comparison.

9. The device of claim 8, further comprising: a communications device that directs an access point to admit the identified individual if the identified individual is authenticated based on the continuously acquired second biometric authentication information.

10. The device of claim 8, wherein:
the first sensor is configured to acquire strong biometric authentication information as the acquired first biometric authentication information; and
the second sensor is configured to continuously acquire weaker biometric authentication information than the acquired first biometric information as the continuously acquired second biometric authentication information.

11. The device of claim 8, wherein: the second sensor further includes an electrocardiogram electrode that is configured to continuously acquire information related to an electrocardiogram as part of the continuously acquired second biometric authentication information.

12. The device of claim 8, wherein the instructions, when executed by the processor, further causes the processor to:
determine that the continuously acquired second biometric authentication information corresponds to the identified individual if a difference between at least one of an absolute amount or a relative amount and the stored data is within a predetermined threshold value.

13. The device of claim 12, wherein: the skin molecules is a type of melanin; and
the peak irradiation wavelength emitted by the wavelength-adjustable source is within the visible light spectrum.

14. The device of claim 12, wherein:
the continuously acquired second biometric authentication information further includes information related to subdermal biomarkers; and
the peak irradiation wavelength emitted by the wavelength-adjustable light source is within the infrared or near-infrared spectrum.

15. A continuous authentication system, comprising:
a continuous authentication device, the continuous authentication device including:
a first sensor configured to acquire first biometric authentication information from an individual;
a wavelength-adjustable light source configured to irradiate a skin part of the individual at a peak irradiation wavelength corresponding to a skin molecule;
a second sensor configured to continuously acquire second biometric authentication information from the individual, the second sensor including a wavelength-adjustable light sensor configured to detect, within a peak detection wavelength band corresponding to the skin molecule, at least one of an intensity of reflection or an intensity of absorbance associated with the irradiated skin part; and
a system controller connected to the continuous authentication device via a network, the system controller including: an input device; a processor; and
a memory including instructions that, when executed by the processor, causes the processor to:
receive first biometric authentication information from the continuous authentication device;
compare the received first biometric authentication information to stored first biometric information to identify the individual;
link the identified individual with the continuous authentication device;
continuously receive second biometric authentication information from the continuous authentication device including the at least one of the intensity of reflection or the intensity of absorbance associated with the irradiated skin part;
compare the continuously acquired second biometric authentication information, acquired in accordance with the irradiating and the detecting at least one of the intensity of reflection or the intensity of absorbance, to stored second biometric information which includes stored data related to the skin molecule that corresponds to the identified individual; and
authenticate the identified individual based on the comparison.

16. The system of claim 15, further comprising: an access point that grants the identified individual linked to the continuous authentication device access to a resource or facility associated with the access point if the identified individual is authenticated based on the continuously received second biometric authentication information.

17. The system of claim 15, wherein:
the received first biometric authentication information is strong biometric authentication information; and
the continuously acquired second biometric authentication information is weaker biometric authentication information than the received first biometric authentication information.

18. The system of claim 15, wherein:
the second sensor further includes an electrocardiogram electrode configured to continuously acquire information related to an electrocardiogram; and
the continuously acquired second biometric authentication information includes information related to the electrocardiogram.

19. The system of claim 15, wherein: the skin molecule is a type of melanin; and
the peak irradiation wavelength emitted by the wavelength-adjustable source is within tile visible light spectrum.

20. The system of claim 15, wherein: the wavelength-adjustable light source is further configured to irradiate the skin part at multiple peak irradiation wavelengths;
the wavelength-adjustable light sensor is further configured to detect a plurality of intensities of reflection or intensities of absorbance; and
the instructions, when executed by the processor, further causes the processor to: determine a reflection or absorbance spectral pattern based on the plurality of intensities of reflection or intensities of absorbance detected when the skin part is irradiated with the multiple peak irradiation wavelengths;
compare the reflection or absorbance spectral pattern with a stored pattern corresponding to the individual; and
authenticate the individual based on comparing the reflection or absorbance spectral pattern with the stored pattern.

* * * * *